United States Patent [19]
Satake et al.

[11] Patent Number: 5,144,180
[45] Date of Patent: Sep. 1, 1992

[54] TWO-STATOR INDUCTION SYNCHRONOUS MOTOR

[75] Inventors: Toshihiko Satake, Higashihiroshima; Yukio Onogi, Hiroshima, both of Japan

[73] Assignee: Satake Engineering Co., Ltd., Tokyo, Japan

[21] Appl. No.: 671,116

[22] Filed: Mar. 18, 1991

[30] Foreign Application Priority Data

Mar. 16, 1990 [JP] Japan ................................ 2-67649
Oct. 31, 1990 [JP] Japan ................................ 2-296735
Dec. 18, 1990 [JP] Japan ................................ 2-411999

[51] Int. Cl.⁵ .................... H02K 17/18; H02K 19/00
[52] U.S. Cl. .................................... 310/212; 310/124; 310/156; 310/161; 310/162
[58] Field of Search .................... 310/212, 112, 67 R, 310/114, 124, 152, 156, 161, 162, 166, 261

[56] References Cited

U.S. PATENT DOCUMENTS

| | | | |
|---|---|---|---|
| 2,733,362 | 1/1956 | Bauer et al. | 310/162 |
| 3,586,938 | 6/1971 | Le Gall | 310/67 R |
| 3,965,380 | 6/1976 | Stepina | 310/77 |
| 4,228,391 | 10/1980 | Owen | 322/35 |
| 4,381,482 | 4/1983 | Doniwa | 318/816 |

FOREIGN PATENT DOCUMENTS

54-34124 10/1979 Japan.

*Primary Examiner*—Steven L. Stephan
*Assistant Examiner*—Matthew Nguyen
*Attorney, Agent, or Firm*—Fish & Richardson

[57] ABSTRACT

A two-stator induction synchronous motor includes a unitary rotor having a first rotor assembly and a second rotor assembly each of which is formed by a permanent magnet and a rotor core. The first rotor assembly and the second rotor assembly respectively have a first pair of and a second pair of magnetic poles of the permanent magnets disposed in such a relative relation that the former and the latter are displaced by 180° or 0° with each other. The motor also includes a phase shifting means which produces a phase difference of 0° or 180° between a voltage induced in rotor conductive members by a rotating magnetic field generated around the first rotor assembly and a voltage induced in rotor conductive members by a rotating magnetic field generated around the second rotor assembly. The two permanent magnets are disposed in such a relation that the attracting or repelling action of one permanent magnet and the repelling or attracting action of the other permanent magnet cancel each other, so that the starting operation is not interfered with. The starting operation is the same as in an induction motor and the running operation is as in a synchronous motor.

20 Claims, 9 Drawing Sheets

F I G. 4
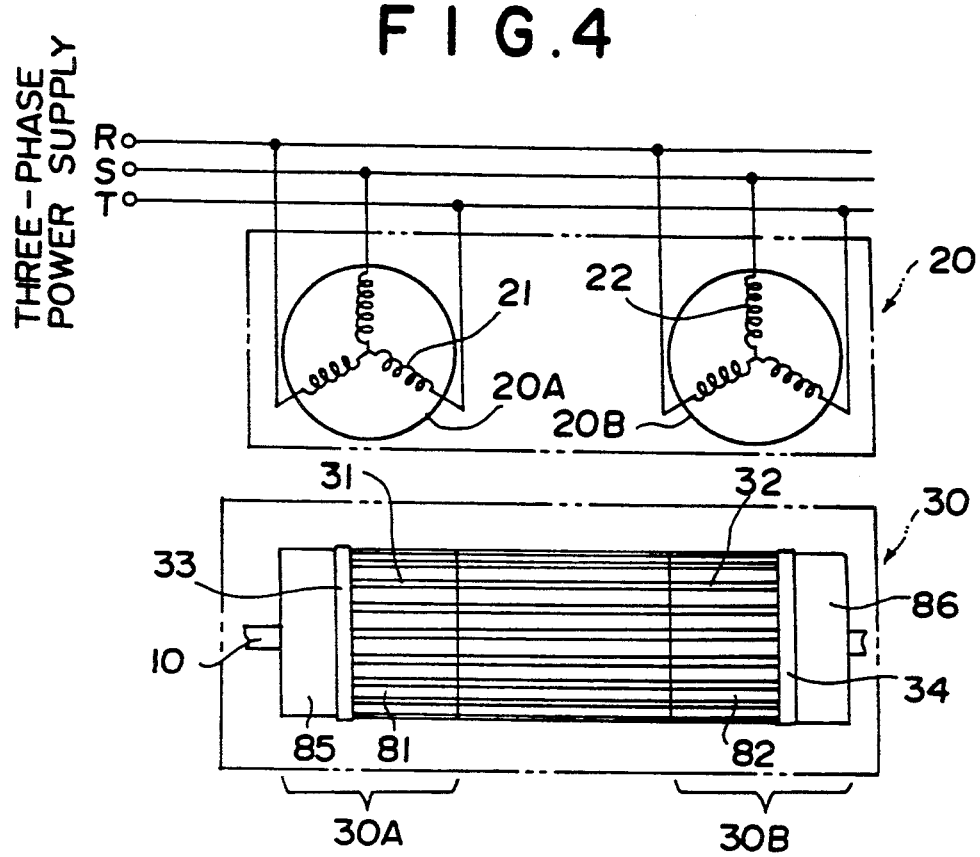
F I G. 5
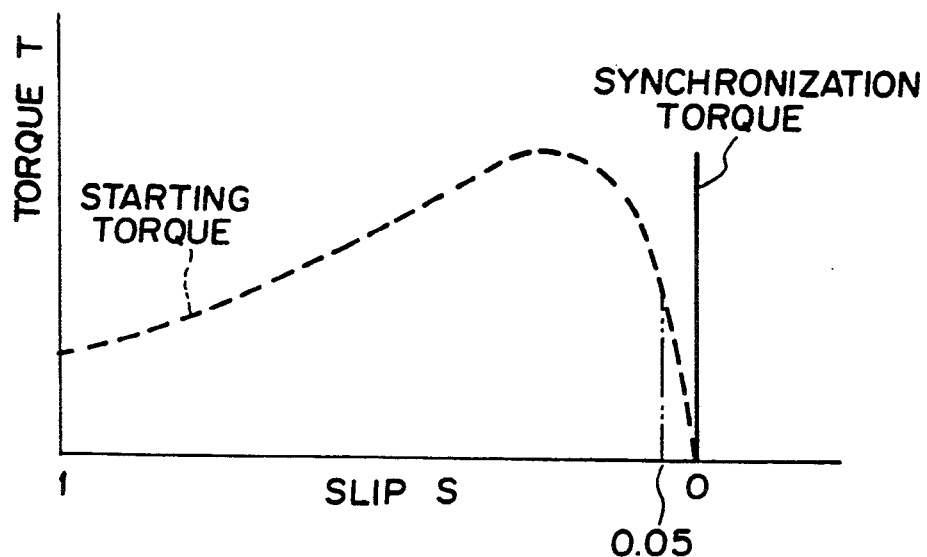

F I G. 6(a)
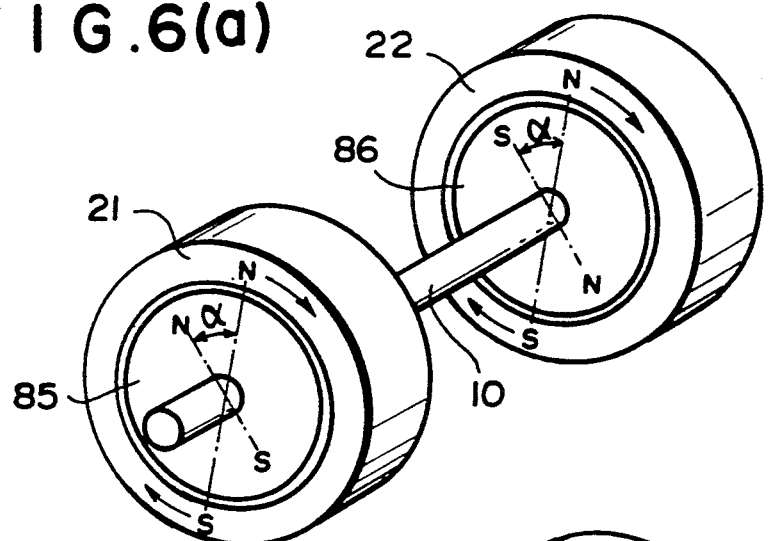
F I G. 6(b)
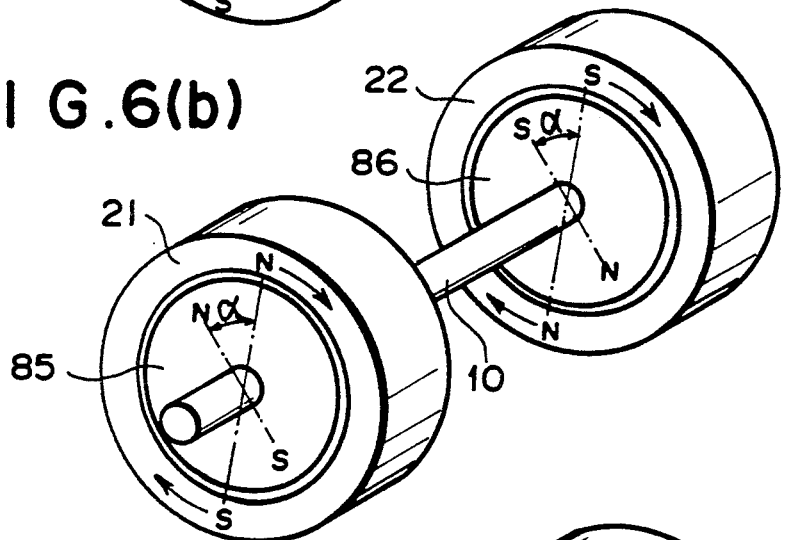
F I G. 6(c)
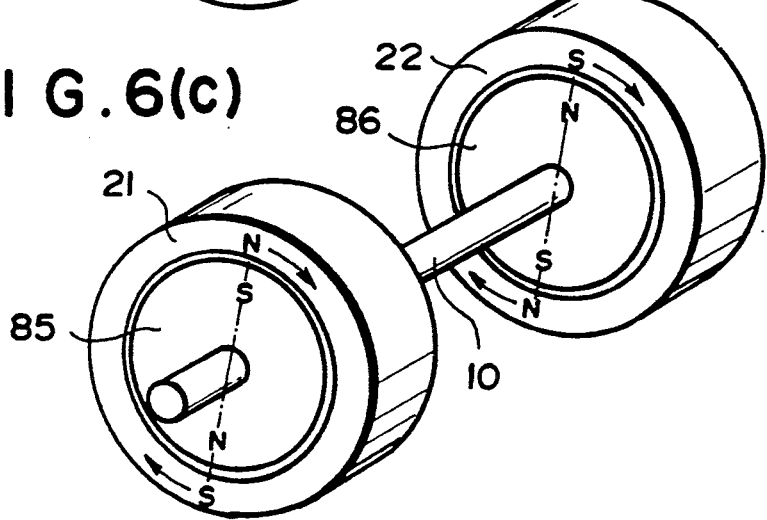

TWO-STATOR INDUCTION SYNCHRONOUS MOTOR

BACKGROUND OF THE INVENTION

The present invention relates to a two-stator induction synchronous motor and, more particularly, to an induction motor which includes two stators and a unitary rotor formed by two rotor core assemblies each having a permanent magnet and which is capable of operating as an inductor motor at the start of the motor and operating as a synchronous motor during the normal running operation.

Generally, a synchronous motor requires a starting means for accelerating its rotor to a rotating speed of rotating magnetic fields produced by stator windings, that is, approximately to a synchronous speed, and a means for effecting DC magnetization of rotor windings for the normal running operation.

An induction synchronous motor has been devised for omitting a starting means and having the synchronous motor itself to posses a starting torque so that the motor can first start as an induction motor with the rotor windings being short-circuited whereby no special means for starting the motor is required. However, such a motor requires brushes since the rotor windings must be magnetized by DC current for synchronous operation of the motor. When the rotating speed of the rotor approaches the synchronous speed, the short-circuiting of the rotor windings is released so that the DC current is allowed to flow to the rotor windings through the brushes from the external DC current power source thereby producing magnetic poles in the rotor. These magnetic poles are attracted by the rotating magnetic fields produced by the stator windings so that the rotor is caused to be rotated at a synchronous speed. The brushes require maintenance checks resulting in extra costs for maintenance so that the development of a synchronous motor having a brushless configuration is strongly desired.

As conventional synchronous motors having a brushless configuration, there are motors of permanent magnet types or reluctance types but these are all limited to small capacity motors because induction starting is not possible and the starting torque is small. Such motors of an inductor type have disadvantages because magnetic passages therein are complex resulting in an increase in the size of the motors. The same is true in the motors using therein an AC magnetizer and a rotary rectifier. A three-phase synchronous motor of a brushless type utilizing a harmonic magnetic field through a square wave voltage of an invertor by having a diode connected to the rotor windings has a disadvantage in that the magnetic magnetizing power of the rotor is insufficient and the output is not strong enough.

Further, Japanese Patent Application Kokoku No. Sho 54(1979)-34124 discloses an arrangement wherein the starting is effected according to the induction motor theory and the synchronous operation is effected by having the DC magnetizing fields formed in the axial direction thereby causing the rotor cores to form magnetic poles. This has a drawback in that the torque produced is asymmetrical with respect to the rotary axis, thereby causing the axis to vibrate.

SUMMARY OF THE INVENTION

Therefore, an object of the present invention is to provide a synchronous motor which can produce a large starting torque and a large synchronous torque but which does not require brushes or any exclusive starting means so that the motor can be simple in its configuration and easy in maintenance.

In carrying out the above and other objects of the invention, there is provided, in one form, a two-stator induction synchronous motor which comprises:

a unitary rotor having a first rotor assembly and a second rotor assembly which are provided on a common rotary axis and each of which is formed by a permanent magnet and a rotor core; a plurality of conductive members which are provided on each of the rotor cores and extending through both the rotor cores; and a pair of short-circuit rings connecting the conductive members at their ends, the first rotor assembly and the second rotor assembly respectively having a first pair and a second pair of magnetic poles of the permanent magnets disposed in such a relative relation that the first pair of magnetic poles and the second pair of magnetic poles are displaced by 180 degrees with each other;

a first stator and a second stator facing surroundingly the first rotor assembly and the second rotor assembly, respectively; and a phase shifting means which produces a phase difference of 0 degree or 180 degrees between a voltage which the first stator produces in the conductive members by a rotating magnetic field generated around the first rotor assembly faced by the first stator and a voltage which the second stator produces in the conductive members by a rotating magnetic fields generated around the second rotor assembly faced by the second stator.

With reference to the functions or operation of a voltage phase shifting device for a multiple stator induction motor, the inventors of the present application have given a full explanation in Japanese Patent Application No. Sho 61(1986)-128314.

The operation of the two-stator induction synchronous motor according to the present invention is explained with the separation being placed between that at the start of the motor and that during the normal running operation. Firstly, at the start of the motor, the voltages are induced in a plurality of rotor conductive members by the rotating magnetic fields produced by the two stators so that current circulates through the rotor conductive members, which allows the motor to start in the same way as an ordinary induction motor.

Under this state, in the two rotating magnetic fields produced by the stator cores and the magnetic pole pairs of the two permanent magnets, the repelling and attracting actions thereof develop separately but simultaneously with each other on the common axis and, since the absolute values of the two repelling and attracting forces are identical and cancel each other, the presence of the permanent magnets in no way interferes with the starting operation of the motor.

After the start of the motor, as the rotating speed of the rotor increases and approaches a rotating speed of the rotating magnetic fields, that is, a synchronous speed, the voltages at the rotor conductive members induced by the rotating magnetic fields become small. The operation up to this point is that of an induction motor but this changes to a synchronous operation when the slip S approaches S=0.05. How this change takes place is explained.

First, the voltage phase shifting means is operated in such a way that a phase difference of 180° is developed between the voltages induced in the plurality of rotor conductive members by the rotating magnetic fields produced by the two rotor cores, that is, in such a way that the current that has been flowing in circulation through the rotor conductive members stops flowing.

On the other hand, the magnetic pole pairs of the two permanent magnets and the magnetic poles of the two rotating magnetic fields produced by the two stators turn to the state wherein they all attract with each other and, as a result, the rotating speed of the motor is rendered to be a synchronous speed.

One of the important functions in the induction synchronous motor according to the present invention is that, at the starting and the accelerating operation, when the action involved is an attracting action by the permanent magnet of the first rotor assembly and the rotating magnetic fields, the action by the permanent magnet of the second rotor assembly and the rotating magnetic fields is a repelling action so that the attracting action and the repelling action cancel each other. Further, during the synchronous operation, due to the function of the voltage phase shifting means, the rotating magnetic fields are 180° displaced from those at the start of the motor and the magnetic poles of the permanent magnets all turn to their attracted states with respect to the rotating magnetic fields.

The induction synchronous motor according to this aspect of the invention is formed by the one rotor and the two stators but, since they are provided with two permanent magnets respectively facing the two stators, the capacity of the motor may be equated to twice that of a synchronous motor having one stator and one rotor.

As explained above, the two-stator induction synchronous motor according to the present invention can produce a large starting torque because the motor starts according the principle of an induction motor and, thus, does not require any other special means for the starting. Further, since the attracting and repelling forces of the permanent magnets cancel each other on the same rotary axis, the start of the motor and the acceleration of the speed of the motor are not interfered with thereby. During the synchronized speed operation, the permanent magnets are attracted by the rotating magnetic fields so that it is possible to increase the synchronization torque by increasing the power or the strength of the permanent magnets of the rotor and, for the synchronous operation, the motor does not require brushes or any related extra maintenance.

As to the power supply for magnetizing the stator windings, it is possible to utilize an AC power source of a commercial frequency or a variable frequency power supply utilizing an invertor. Use of such variable frequency power supply can facilitate changing synchronous speeds. The phase used can be either a single phase or multiple phases.

BRIEF DESCRIPTION OF THE DRAWINGS

The above and other objects, features and advantages of the present invention will be apparent from the following description of preferred embodiments of the invention explained with reference to the accompanying drawings, in which:

FIG. 4 shows a modified arrangement of the first embodiment shown in FIG. 1, wherein the permanent magnets are arranged outside of the respective rotor cores;

FIG. 5 shows torque characteristic curves obtained by the first embodiment shown in FIG. 1;

FIGS. 6(a)-6(c) show relative relations between the magnetic poles of the permanent magnets and the rotating magnetic fields in the first embodiment shown in FIG. 1;

PREFERRED EMBODIMENTS OF THE INVENTION

Throughout the following explanation, similar reference symbols or numerals refer to the same or similar elements in all figures of the drawings.

Figure 1:
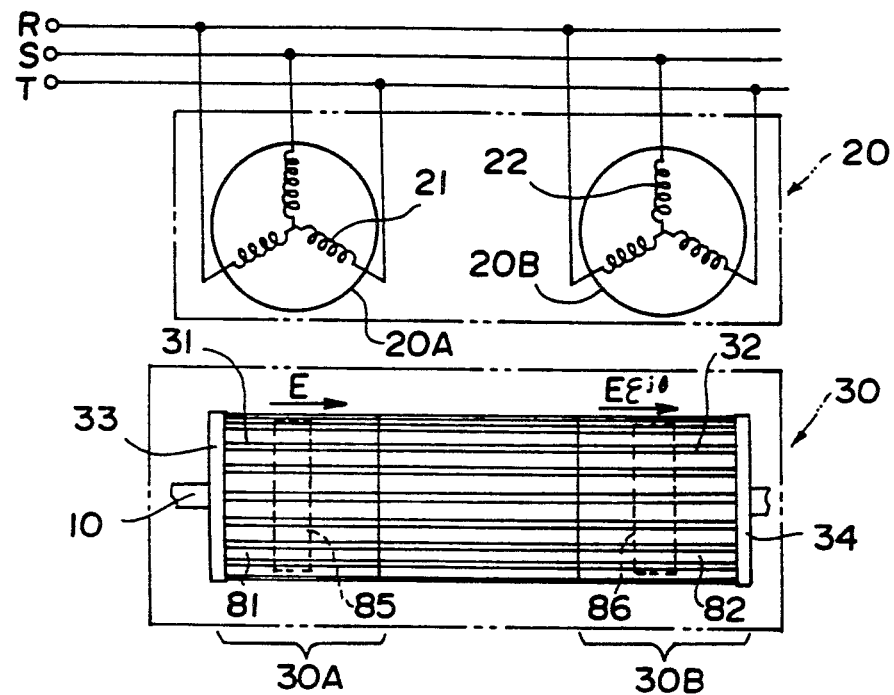
FIG. 1 diagrammatically shows the main structural elements of the synchronous motor of a first embodiment according to the invention.

A first embodiment according to the present invention will now be explained with reference to FIGS. 1 to 7. In FIG. 1, numeral 20 represents an arrangement at the side of the stators and numeral 30 represents an arrangement at the side of the rotor. At the stator side 20, two stator windings 21, 22 are connected in series to three-phase AC power supply terminals R, S and T.

Two rotor cores 81, 82 are provided on a rotary axis 10 at the rotor side 30 and these rotor cores 81, 82 contain therein permanent magnets 85, 86 each having a pair of N- and S-poles. A plurality of rotor conductive members 31, 32 are provided on and extend through peripheries of the two rotor cores 81, 82 and are respectively connected by short-circuit rings 33, 34 which are provided at the two ends of the rotor conductive members 31, 32 for them to be short-circuited thereby forming a unitary squirrel-cage type rotor. The rotor core 81, the permanent magnet 85, the rotor conductive members 31 and the short-circuit ring 33 constitute a first rotor assembly. The rotor core 82, the permanent magnet 86, the rotor conductive members 31 and the short-circuit ring 33 constitute a second rotor assembly.

Figure 2:
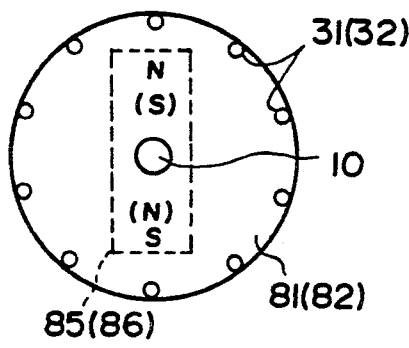
FIG. 2 shows a diagrammatic sectional view of a rotor core of a cylindrical type.
Figure 3:
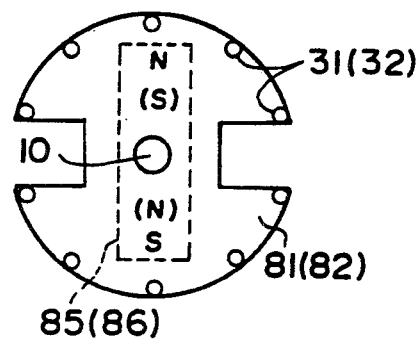
FIG. 3 shows a diagrammatic sectional view of a rotor core of a salient-pole type.

FIG. 2 shows a sectional view of a rotor core of a cylindrical type and FIG. 3 shows a sectional view of a rotor core of a salient pole type.

As shown in FIGS. 2 and 3, the magnetic poles of the two magnets 85, 86 are disposed in such a way that, with the N-pole and the S-pole being in a pair, the N-pole (or S-pole) of one of the permanent magnets 85 and the S-pole (or N-pole) of the other of the permanent magnets 86 are respectively disposed at identical corresponding positions.

The permanent magnets 85, 86 are not limited to be housed within the rotor cores 81, 82 and they may be arranged at out side end portions of the rotor cores 81, 82, as diagrammatically illustrated in FIG. 4, as separates elements from both the rotor cores. Further, the rotor core 81 and the rotor core 82 are not limited to be separate elements and they may be formed as a unitary member.

Here, it is assumed that the voltage induced in the rotor conductive members 31 surroundingly facing the stator 20A having stator windings 21 is in the direction E as shown in FIG. 1 and the voltage induced in the rotor conductive members 32 surroundingly facing the stator 20B having stator windings 22 is in the direction $E\epsilon j^\theta$ as also shown in FIG. 1. The symbol $\theta$ is a phase difference angle of the voltages.

Now, the operation of the motor having the above configuration is explained. First, at the start of the motor, the power is supplied in the state in which the stator windings 21, 22 are connected such that the phase difference angle $\theta$ of the voltages induced by the rotating magnetic fields of the rotor conductive members 31, 32 is $\theta = 0°$. As a consequence, the three-phase current flows from the power supply to the stator windings 21, 22 whereby the rotating magnetic fields having respectively the same phase are produced and the voltages are induced in the rotor conductive members 31, 32. However, since the phase difference angle of the induced voltages is $\theta = 0°$, the current to flow to the rotor conductive members circulates from the rotor conductive members 31 to the rotor conductive members 32. The torque by the rotating magnetic fields produced by the stator windings 21, 22 and the current flowing to the rotor conductive members 31, 32 is the same as that in a conventional induction motor. That is, the motor of the invention starts under the characteristic curve as shown in FIG. 5.

Here, some consideration is given to an interaction between the magnetic poles of the permanent magnets 85, 86 and the poles of the rotating magnetic fields produced by the stator windings 21, 22.

FIGS. 6(a) to 6(c) show relative positions of the magnetic pole pairs of the permanent magnets 85, 86 connected with each other on the rotary axis 10 and the rotating magnetic fields produced by the two stators 20A, 20B. As shown in the drawings, the N-pole of the permanent magnet 85 and the S-pole of the permanent magnet 86 are disposed at identical corresponding positions and similarly the S-pole of the permanent magnet 85 and the N-pole of the permanent magnet 86 are disposed at identical corresponding positions.

Also, as illustrated, the magnetic poles N and S of the rotating magnetic fields produced by the stator windings 21 and the magnetic poles N and S of the rotating magnetic fields produced by the stator windings 22 both rotate in the same direction at the synchronous speed but the phase difference angle $\theta$ between the two rotating magnetic fields produced by the two stator windings 21, 22 is $\theta = 0°$ so that the magnetic pole N (or S) of the rotating magnetic fields produced by the stator windings 21 and the magnetic pole N (or S) of the rotating magnetic fields produced by the stator windings 22 are always at identical corresponding positions.

Therefore, assuming that the central angle between the N-pole of the permanent magnet 85 and the N-pole of the rotating magnetic fields produced by the stator windings 21 is momentarily $\alpha$, the central angle between the S-pole of the permanent magnet 86 and the N-pole of the rotating magnetic fields produced by the stator windings 22 will also be $\alpha$. Therefore, the repelling force of the N-N poles acting against the permanent magnet 86 equals to the attracting force of the S-N poles acting against the permanent magnet 86. Thus, the repelling force and the attracting force completely cancel each other with a result that, from the overall aspect of the rotor, the permanent magnets 85, 86 are not influenced by the rotating magnetic fields. That is, the magnetic poles of the permanent magnets are in no way bound by the rotating magnetic fields. Therefore, the two-stator induction synchronous motor according to this invention can start with the same torque characteristics as those in a conventional induction motor, thereby enabling to provide a large starting torque without the need of any special starting means. It can readily be understood from the characteristic curves shown in the above FIG. 5 that the starting torque is large enough and there is no need of any special starting means.

After the starting of the motor, as the rotating speed of the rotor increases and the slip S approaches $S = 0.05$, the motor enters into its synchronous operation. How this is done is hereinafter explained.

First, by the operation of the voltage phase shifting means, the position of one of the two stator windings 21, 22, for example, the stator windings 22, is changed by being rotated about the rotary axis so that a phase difference of 180° is provided between the two rotating magnetic fields produced respectively by the two stator windings 21, 22.

Figure 7:
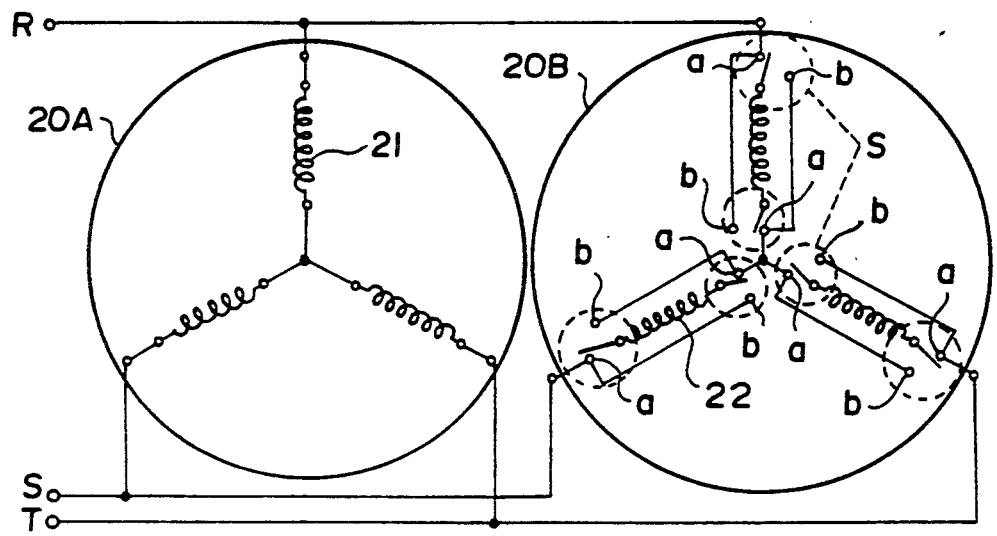
FIG. 7 shows an example of the phase shifting means.
Figure 8:
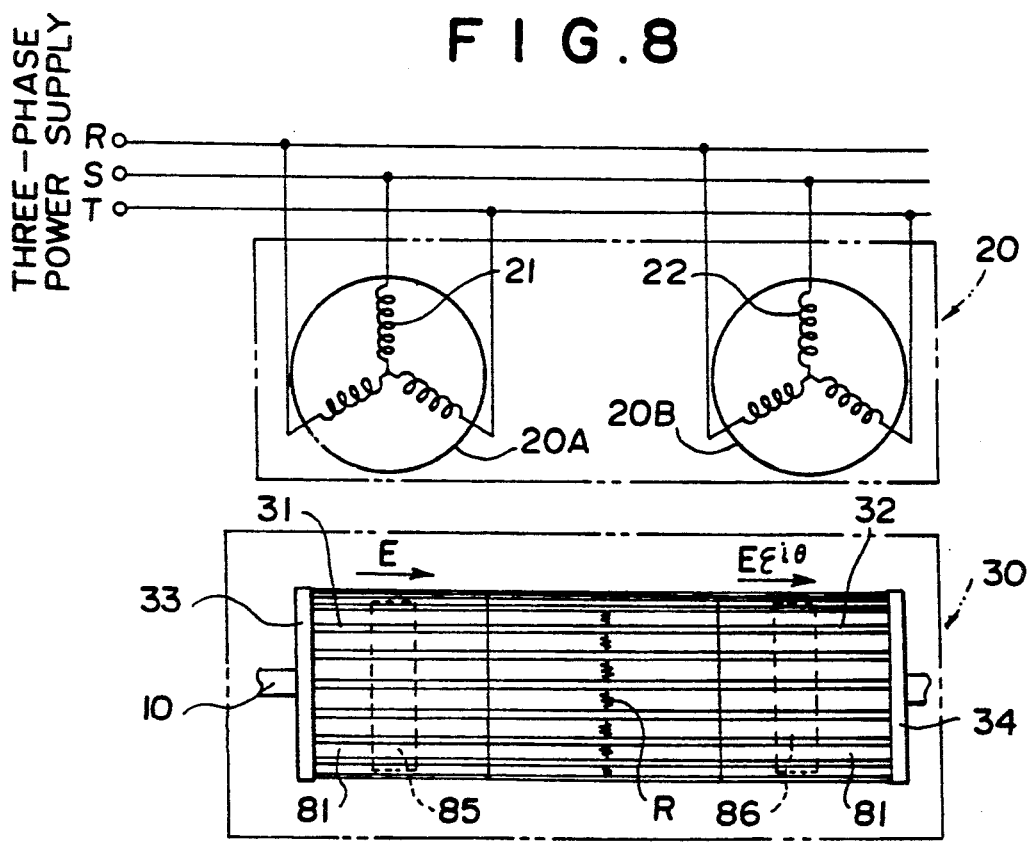
FIG. 8 shows the main structural elements of the motor of the second embodiment according to the invention.

Instead of the mechanical means for effecting the phase shifting as explained above, it is possible to provide an arrangement, as shown in FIG. 7, wherein a phase changing switch S is provided between the stator windings and each phase of the three-phase power sources R, S and T and wherein, by having all of the connection points thereof switched from "a" side to "b" side, the phase difference angle $\theta$ of the two rotating magnetic fields produced by the stator windings 21, 22 may be made $\theta = 180°$.

When the phase difference angle $\theta$ of the rotating magnetic fields is $\theta = 180°$, the phase difference $\theta$ of the induced voltages in the two rotor conductive members 31, 32 becomes $\theta = 180°$ and the sum of the induced voltages of the rotor conductive members 31, 32 becomes $E + E\epsilon j^{180°} = E - E = 0$, so that the current stops flowing to the rotor conductive members 31, 32.

Now, the interactions between the magnetic poles of the permanent magnets 85, 86 and the magnetic poles of the rotating magnetic fields produced by the two stator windings 21, 22 are again considered.

During the synchronous operation of the motor, the phase difference angle $\theta$ of the two rotating magnetic fields produced by the two stator windings 21, 22 is $\theta = 180°$ so that, as shown in FIG. 6(b), the magnetic pole N (or S) of the rotating magnetic fields produced by the stator windings 21 and the magnetic pole N (or S) of the rotating magnetic fields produced by the stator windings 22 are always at different positions with the difference being 180° in an electrical angle. In other words, the N-pole of the rotating magnetic fields produced by the stator windings 21 and the S-pole of the rotating magnetic fields produced by the stator windings 22 are always at identical corresponding positions.

Therefore, the N-pole of the permanent magnet 85 and N-pole of the rotating magnetic fields produced by the stator windings 21 repel each other and, similarly, the S-pole of the permanent magnet 86 and the S-pole of the rotating magnetic fields produced by the stator windings 22 repel each other with the consequence that the positions of the permanent magnets 85, 86 become stable under the condition in which all of the N-S poles are attracted in the positions as shown in FIG. 6(c). That is, the whole magnetic poles of the permanent magnets 85, 86 are attracted by the magnetic poles of the rotating magnetic fields produced by the stator windings 21, 22 and the rotor rotates at the same speed as that of the rotating magnetic fields, that is, at a synchronous speed.

Next, a synchronous motor according to the present invention is explained hereunder with reference to FIG. 8 through FIG. 12.

Figure 9:
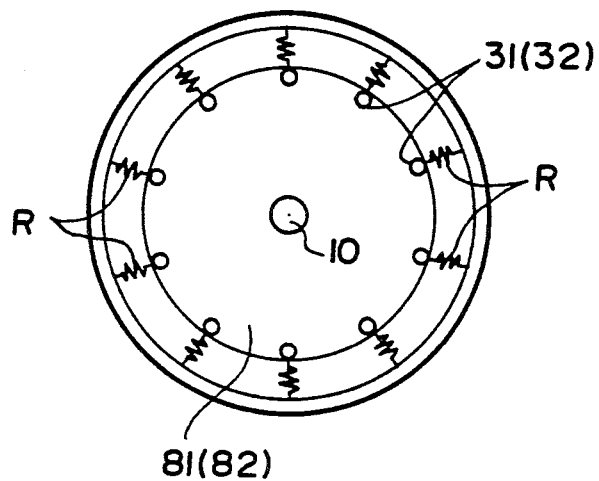
FIG. 9 shows the connection of the resistive members to the rotor conductive members.

This second embodiment is different from the first embodiment in that, as a first point, the rotor conductive members 31, 32 are resistively short-circuited between the first rotor assembly 30A and the second rotor assembly 30B by a plurality of connecting members R . . . as shown in FIG. 9. The connecting members R . . . are formed by material having high resistance. A second point contrasted is that the magnetic pairs of the permanent magnet of the first rotor assembly 30A and the magnetic pairs of the permanent magnet of the second rotor assembly 30B are disposed so that they are located at identically corresponding positions unlike in the arrangement of the first embodiment in which they are disposed at positions 180 degrees relatively displaced with each other.

Figure 10:
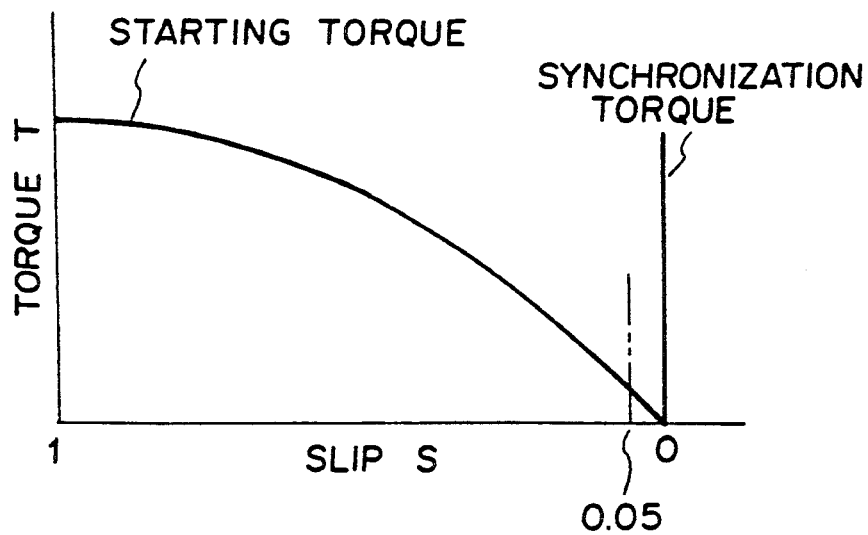
FIG. 10 shows torque characteristic curves obtained by the second embodiment shown in FIG. 8.

The starting operation of the motor in this embodiment takes place when the phase difference effected by the voltage phase difference means is $\theta = 180°$. Under this state, there are induced voltages in reverse directions with each other in the rotor conductive members 31, 32 but the connecting members R . . . interposed between the first and second rotor assemblies 30A and 30B allow current to flow, so that the starting torque is produced between the rotating magnetic fields and the currents, unlike the case in the first embodiment. Also, since the connecting members R . . . are of material having high resistance, the starting torque generated is large. As shown in FIG. 10, the motor starts in the same torque characteristics as those in a conventional induction motor having secondary high resistance. During the synchronous operation in the second embodiment, the phase difference $\theta$ effected by the voltage phase shifting means is $\theta = 0°$.

Figure 11A:
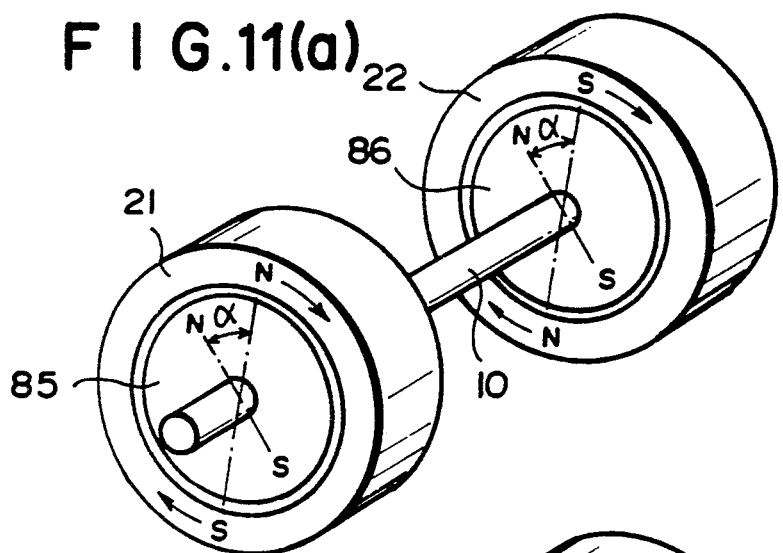
FIGS. 11(a)-11(c) show relative relations between the magnetic poles of the permanent magnets and the rotating magnetic fields in the second embodiment shown in FIG. 8.
Figure 11B:
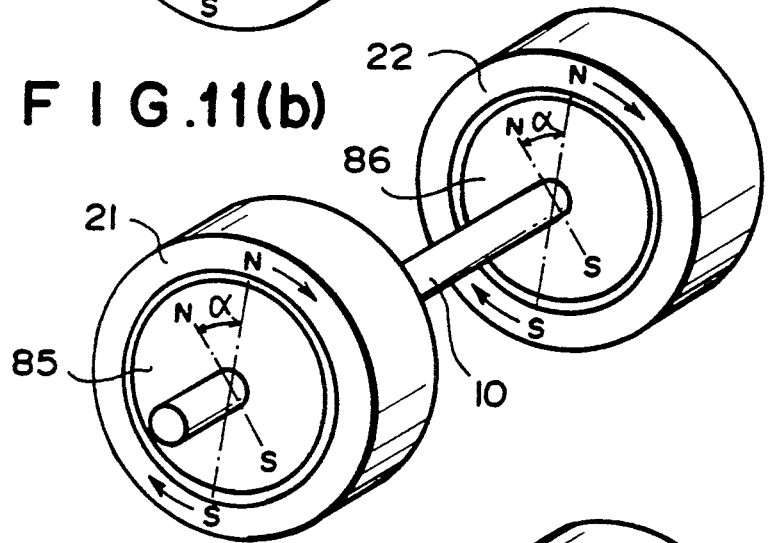
Figure 11C:
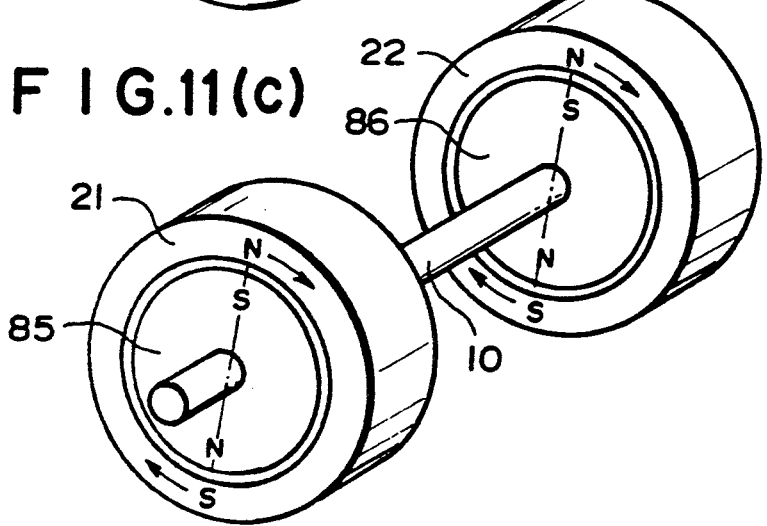

FIG. 11(a) to FIG. 11(c) show relative positions which take place, respectively during the starting operation, during the transient state just prior to the motor entering into the synchronous operation and during the synchronous operation, between the magnetic poles of the magnetic pairs of the permanent magnets 85, 86 connected with each other on the rotary axis 10 and the rotating magnetic fields produced by the stator windings 21, 22.

Figure 12:
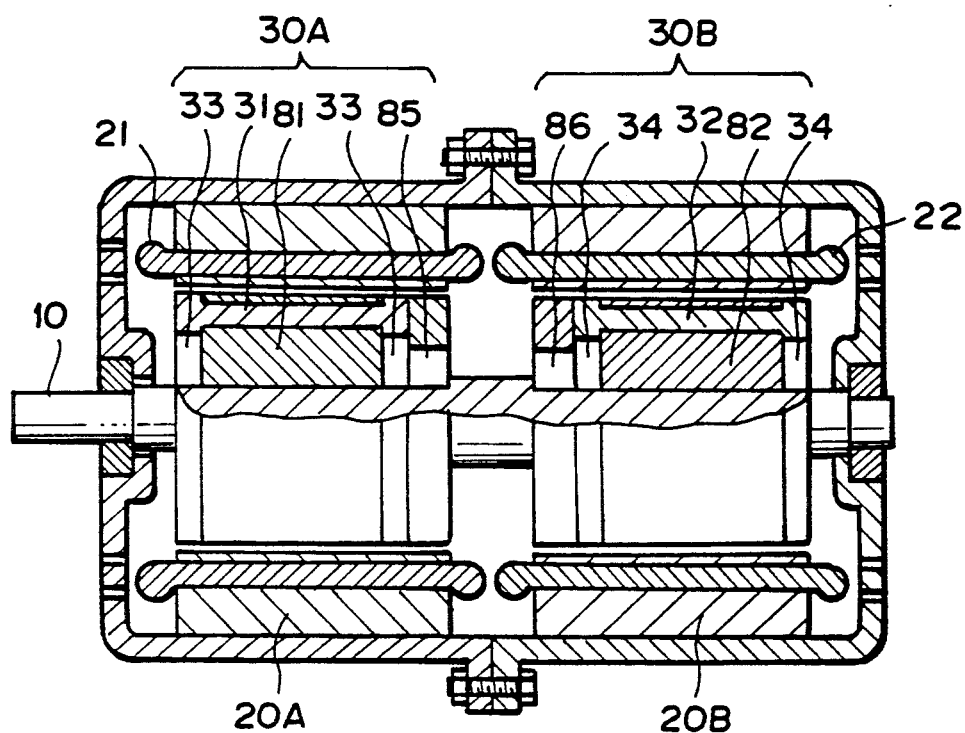
FIG. 12 is a sectional view, partly in broken away, of the synchronous motor of the third embodiment according to the present invention.

FIG. 12 shows a side sectional view of a two-stator induction synchronous motor of a third embodiment according to the invention. The main difference in this embodiment from the above explained first and second embodiments is that the rotor conductive members 31 of the first rotor assembly 30A and the rotor conductive members 32 of the second rotor assembly 30B are continuously disposed between or extending through the rotor core 81 and the rotor core 82. That is, in this third embodiment, the first rotor assembly 30A and the second rotor assembly 30B are completely separated both electrically and magnetically.

One of the important structural features in the third embodiment is that the permanent magnet 85 of the first rotor assembly 30A and the permanent magnet 86 of the second rotor assembly 30B are disposed in such a way that the attracting or repelling action between the magnetic poles of the permanent magnet 85 and the magnetic poles of the rotating magnetic field produced by the first stator 20A and the repelling or attracting action between the magnetic poles of the permanent magnet 86 and the magnetic poles of the rotating magnetic field produced by the second stator 20B cancel each other at the starting operation of the motor.

Figure 13A:
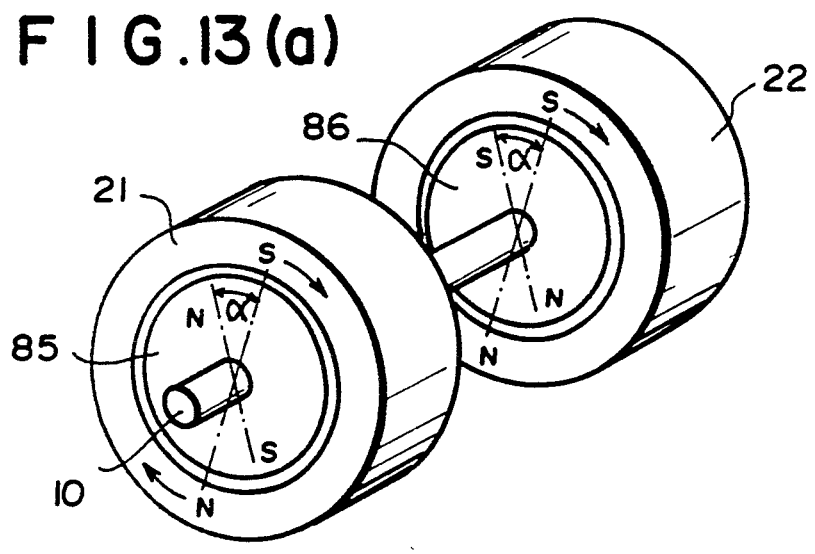
FIGS. 13(a)-13(c) show relative relations between the magnetic poles of the permanent magnets and the rotating magnetic fields in the third embodiment shown in FIG. 12.
Figure 13B:
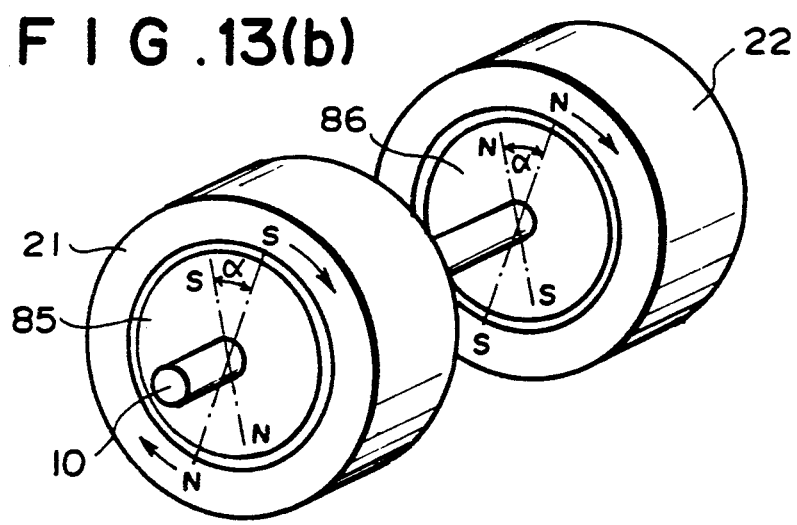
Figure 13C:
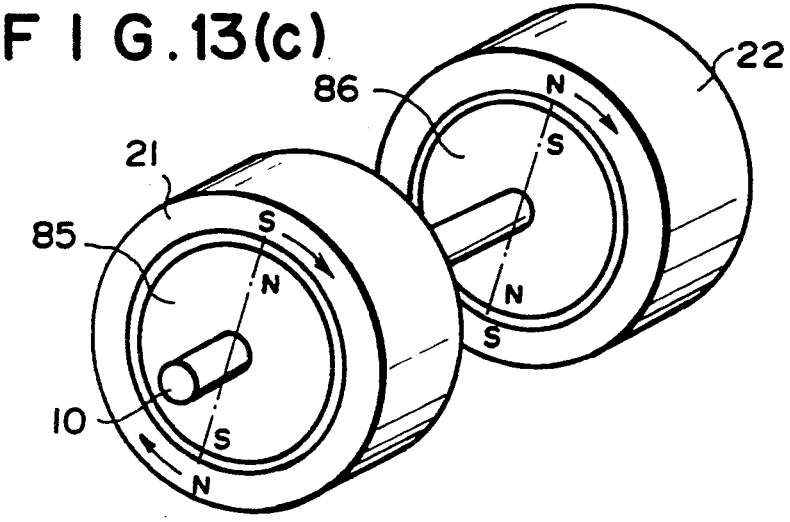

FIGS. 13(a) to 13(c) show examples of relative positions of such magnetic pairs of the permanent magnets 85 and 86 provided on the rotary axis 10 and the rotating magnetic fields produced by the stator windings 21 and 22. The relative positions are shown respectively as those assumed during the starting operation, during the transient state just prior to the motor entering into the synchronous operation and during the synchronous operation. In the illustrated examples, the phase difference $\theta$ which the two stator windings 21, 22 produce by the phase shifting means is 0° during the starting operation and 180° during the synchronous operation of the motor. Where the phase difference $\theta$ is 180° during the starting operation and 180° during the synchronous operation, the permanent magnet 85 of the first rotor assembly 30A and the permanent magnet 86 of the second rotor assembly 30B may be, in one form, arranged in a unitary structure.

Figure 14:
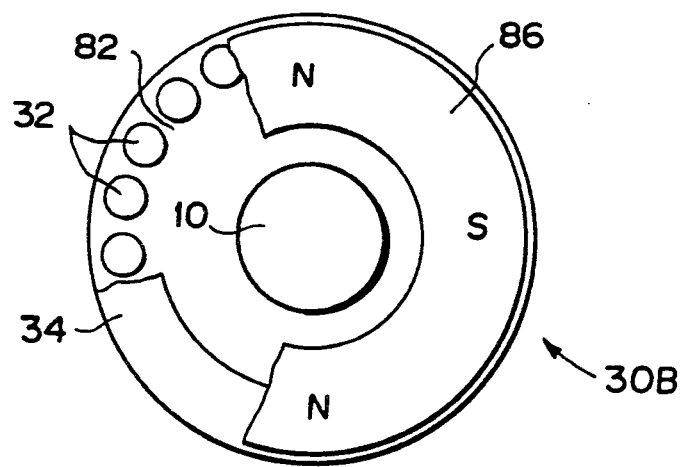
FIG. 14 is a diagrammatic view of the second rotor assembly seen from the side of the first rotor assembly.
Figure 15A:
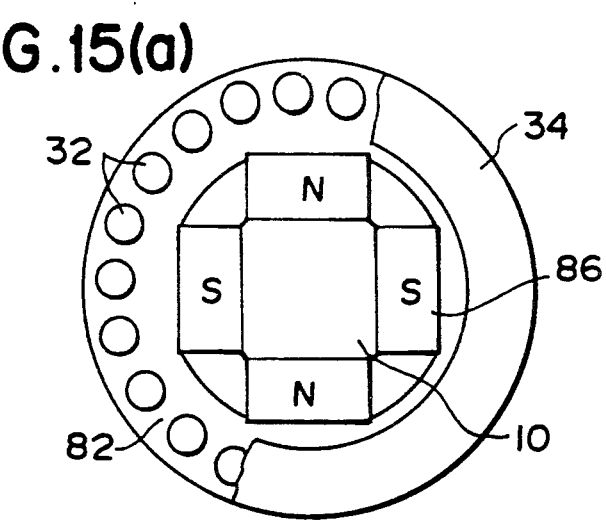
FIGS. 15(a)-15(c) show arrangements of the permanent magnets in the rotor cores.
Figure 15B:
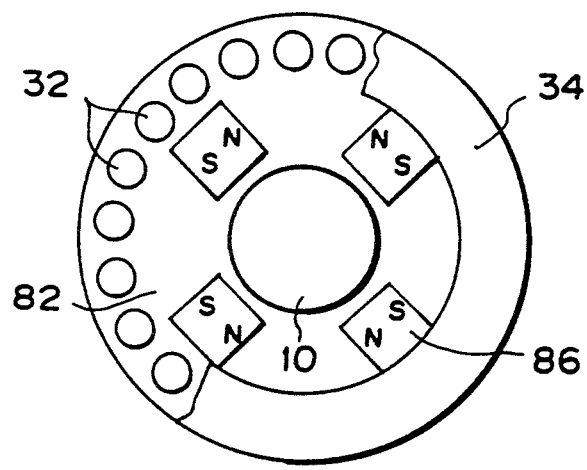
Figure 15C:
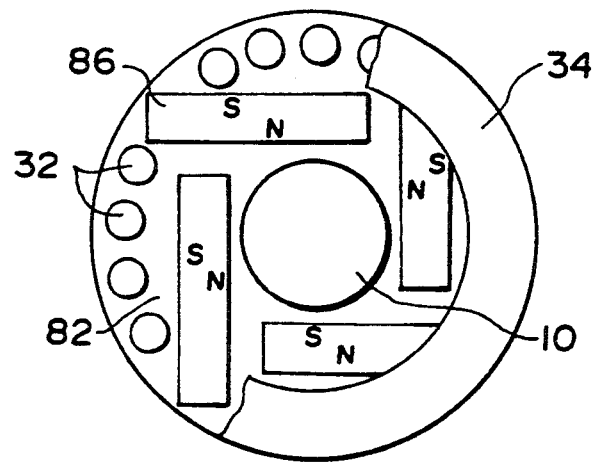

FIG. 14 shows the second rotor assembly 30B as seen from the side of the first rotor assembly 30A. The permanent magnets 86 are, as illustrated in FIGS. 15(a) to 15(c), housed within the rotor core 82.

The motor arranged as above is simple in construction and provides a large starting torque. It also provides a large synchronous torque and this may be achieved by increasing the power or strength of the permanent magnets.

Since the motor operates as an induction motor when it is started, the power supply source can be one which is generally used for an induction motor. In other words, it is possible to utilize an AC power source of a commercial frequency or a variable frequency power supply utilizing an invertor. The phase may either be a single phase or multiple phases.

The above explantion and the illustration in the drawings concerning the embodiments premised on the arrangement wherein the two stator windings are connected in parallel but, of course, they can be connected in series. Further, for the sake of similicity, the number of magnetic poles is assumed as two but again this number is not limitative.

In the two-stator induction synchronous motor according to the present invention, the starting operation is the same as that in a conventional induction motor and, from the time when the slip S approaches $S = 0.05$, the speed changes to a synchronous speed and the motor operates with torque characteristics of a synchronous motor. This two-stator induction synchronous motor does not require brushes, which makes the construction and constitution of the motor simpler. Also, the motor is capable of operating at the start in the same torque characteristics as in an induction motor, which makes it possible for the motor to start even under a loaded condition and continue to the synchronous operation.

Since the motor according to the present invention is equipped with both the torque characteristics of an induction motor and those of a synchronous motor, it can operate with either of the torque characteristics. This means that, in case the motor undergoes a step-out for some reasons, it is possible to switch the operation from that with the synchronous torque characteristics to that with the induction torque characteristics so that, unlike in an ordinary synchronous motor, the motor may be prevented from suddenly stopping.

As explained above, the motor does not require brushes and makes the configuration simple and, further, is capable of operating with a large starting torque and a large synchronous torque.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A two-stator induction synchronous motor comprising:
   a unitary rotor having a first rotor assembly and a second rotor assembly which are provided on a common rotary axis and each of which is formed by a permanent magnet and a rotor core; a plurality of conductive members which contact each of said rotor cores; and a pair of short-circuit rings connecting said conductive members at their ends,
   said first rotor assembly and said second rotor assembly respectively having a first pair and a second pair of magnetic poles of said permanent magnets disposed in such a relative relation that said first pair of magnetic poles and said second pair of magnetic poles are displaced by 180 degrees with each other;
   a first stator and a second stator facing surroundingly said first rotor assembly and said second rotor assembly, respectively; and
   a phase shifting means which produces a phase difference of 0 degree or 180 degrees between a voltage which said first stator produces in said conductive members by a rotating magnetic field generated around said first rotor assembly faced by said first stator and a voltage which said second stator produces in said conductive members by a rotating magnetic field generated around said second rotor assembly faced by said second stator.

2. A two-stator induction synchronous motor according to claim 1, in which said phase shifting means is one which produces a phase difference of 0 degree at the start of the motor and 180 degrees during the normal running operation.

3. A two-stator induction synchronous motor according to claim 1, in which each of said two rotor cores is of a cylindrical type.

4. A two-stator induction synchronous motor according to claim 1, in which each of said two rotor cores is of a salient pole type.

5. A two-stator induction synchronous motor according to claim 1, in which said rotor core of first rotor assembly and that of said second rotor assembly are formed in one piece.

6. A two-stator induction synchronous motor according to claim 1, in which said phase shifting means is a mechanical means for providing a relative displacement in said first stator and said second stator.

7. A two-stator induction synchronous motor according to claim 1, in which said phase shifting means includes a switching means for switching stator winding connections of said first stator and said second stator to a power source.

8. A two-stator induction synchronous motor according to claim 1, wherein said plurality of conductive members are provided on an outer surface of each of said rotor cores.

9. A two-stator induction synchronous motor according to claim 1, wherein said plurality of conductive members extend through both said rotor cores.

10. A two-stator induction synchronous motor comprising:
    a unitary rotor having a first and a second rotor assembly which are provided on a common rotary axis and each of which is formed by a permanent magnet and a rotor core; a plurality of conductive members which contact each of said rotor cores, a plurality of resistive members which short-circuit said plurality of conductive members at a position between said first and second rotor assemblies; and a pair of short-circuit rings which short-circuit said plurality of conductive members at their ends,
    said first rotor assembly and said second rotor assembly respectively having a first pair and a second pair of magnetic poles of said permanent magnets disposed in such a relative relation that said first pair of magnetic poles and said second pair of magnetic poles are at identically corresponding positions;
    a first stator and a second stator facing surroundingly said first rotor assembly and said second rotor assembly, respectively; and
    a phase shifting means which produces a phase difference of 0 degree or 180 degrees between a voltage which said first stator produces in said conductive members by a rotating magnetic field generated around said first rotor assembly faced by said first stator and a voltage which said second stator produces in said conductive members by a rotating magnetic field generated around said second rotor assembly faced by said second stator.

11. A two-stator induction synchronous motor according to claim 10, in which said phase shifting means is one which produces a phase difference of 180 degrees at the start of the motor and a phase difference of 0 degree during the normal running operation of the motor.

12. A two-stator induction synchronous motor according to claim 10, in which each of said two rotor cores formed by the permanent magnet is of a cylindrical type.

13. A two-stator induction synchronous motor according to claim 10, in which each of said two rotor cores is of a salient pole type.

14. A two-stator induction synchronous motor according to claim 10, in which said phase shifting means includes a switching means for switching stator winding connections of said first and said second stator to a power source.

15. A two-stator induction synchronous motor according to claim 10, wherein said plurality of conductive members are provided on an outer surface of each of said rotor cores.

16. A two-stator induction synchronous motor according to claim 10, wherein said plurality of conductive members extend through both said rotor cores.

17. A two-stator induction synchronous motor comprising:
- a unitary rotor having a first and a second rotor assembly which are provided on a common rotary axis, each of which has a permanent magnet and a rotor core, and each of which has a plurality of conductive members contacting said rotor core and has a pair of short-circuit rings short-circuiting said conductive members at their ends;
- a first stator and a second stator facing surroundingly said first rotor assembly and said second rotor assembly, respectively; and
- a phase shifting means for producing a phase difference between a first magnetic field flux which said first stator generates around said first rotor assembly faced by said first stator and a second rotating magnetic field flux which said second stator generates around said second rotor assembly faced by said second stator, said phase difference being 0 degree or 180 degrees at the start of the motor and being 180 degrees from such phase difference of the start during the synchronous operation of the motor,
- said permanent magnet of said first rotor assembly and said permanent magnet of said second rotor assembly being disposed in such a relation that the attracting or repelling action between the magnetic pole pairs of said permanent magnet in said first rotor assembly and the rotating magnetic fields produced by said first stator and the repelling or attracting action between the magnetic pole pairs of said permanent magnet in said second rotor assembly and the rotating magnetic fields produced by said second stator cancel each other.

18. A two-stator induction synchronous motor according to claim 17, in which said permanent magnet of said first rotor assembly and said permanent magnet of said second rotor assembly are disposed between said first and second rotor assemblies and are formed in one piece.

19. A two-stator induction synchronous motor according to claim 17, wherein said plurality of conductive members are provided on an outer surface of each of said rotor cores.

20. A two-stator induction synchronous motor according to claim 17, wherein said plurality of conductive members extend through both said rotor cores.

* * * * *